US006585060B1

(12) United States Patent
Iritani

(10) Patent No.: US 6,585,060 B1
(45) Date of Patent: Jul. 1, 2003

(54) PNEUMATIC ROTATING TOOL

(75) Inventor: Toshiro Iritani, Sagamihara (JP)

(73) Assignee: K-R Industry Company Limited (JP)

( * ) Notice: Subject to any disclaimer, the term of this patent is extended or adjusted under 35 U.S.C. 154(b) by 0 days.

(21) Appl. No.: 10/090,760

(22) Filed: Mar. 6, 2002

(30) Foreign Application Priority Data

Jan. 24, 2002 (JP) ....................................... 2002-015197

(51) Int. Cl.$^{7}$ ................................................ B23B 45/04
(52) U.S. Cl. ....................................... 173/169; 173/109
(58) Field of Search ................................ 173/109, 155, 173/169, 218

(56) References Cited

U.S. PATENT DOCUMENTS 2,709,446 A * 5/1955 Miller ........................ 137/270
2,788,768 A * 4/1957 Fischer ........................ 91/317
3,015,341 A * 1/1962 Hedland et al. ............ 137/493
3,373,824 A * 3/1968 Whitehouse ................ 173/177
3,802,538 A * 4/1974 Brown ........................ 181/230
3,811,514 A * 5/1974 Blomberg et al. .......... 173/169
4,416,338 A * 11/1983 Nelson et al. .............. 173/206
4,773,487 A * 9/1988 Ringer ........................ 173/18
4,962,787 A * 10/1990 Mayhew .................. 137/556.3

* cited by examiner

*Primary Examiner*—Scott A. Smith
*Assistant Examiner*—Nathaniel Chukwurah
(74) *Attorney, Agent, or Firm*—Lorusso, Loud & Kelly

(57) ABSTRACT

A pneumatic rotating tool is disclosed wherein the amount of air discharged is adjusted with a finger of the hand which holds the tool, thereby making it possible to adjust the rotational speed of the air motor incorporated in the tool. Rotation of a cylindrical regulator relative to a cylindrical housing is limited to an angle through a predetermined range centered on an axis of the cylindrical housing. The regulator is formed with a cutout portion and a depression both for opening exhaust holes formed in the motor body. The regulator is further formed with thick-wall portions for closing the exhaust holes.

9 Claims, 7 Drawing Sheets

PNEUMATIC ROTATING TOOL

CROSS-REFERENCE TO RELATED APPLICATION

This application claims, under 35 USC 119, priority of Japanese Application No. 2002–015197 filed Jan. 24, 2002.

BACKGROUND OF THE INVENTION

1. Field of the Invention

The present invention relates to a pneumatic rotating tool with an air motor incorporated therein.

2. Description of the Prior Art

Pneumatic rotating tools such as ratchets and drills have heretofore been known. In pneumatic rotating tools, which incorporate an air motor, air is introduced into the air motor to rotate the motor, thereby rotating various tools, including ratchets.

A pneumatic rotating tool is provided with a regulator for adjusting the amount of air to be introduced into the air motor, thereby changing the rotational speed of the air motor. Generally, the regulator is of the type in which the cross-sectional area of an air passage formed on the air inlet side of the air motor is adjusted. Such regulators are classified into those separate from the pneumatic rotating tool and those integral therewith. In the separate type, the regulator cannot be operated with the hand which holds the pneumatic rotating tool and thus with one hand it is impossible to both hold the pneumatic rotating tool and operate the regulator.

Also, in the integral type, it is necessary that a lever for a valve, which adjusts the amount of air to be introduced, be operated with a hand different from the hand which holds the pneumatic rotating tool. Accordingly, it is impossible, with a single hand, to both hold the pneumatic rotating tool and operate the regulator. Thus, change of the rotational speed of the air motor in the conventional pneumatic rotating tool requires that the regulator be operated with a hand different from the tool holding hand, so that the working efficiency is poor.

SUMMARY OF THE INVENTION

The present invention has been accomplished in view of the above drawbacks of the prior art and it is an object of the invention to provide a pneumatic rotating tool permitting a finger of the hand which holds the pneumatic rotating tool to adjust the amount of air discharged, thereby changing the rotational speed of the air motor incorporated in the tool.

In one aspect of the present invention there is provided a pneumatic rotating tool having a cylindrical housing, an air motor fixed within the cylindrical housing and having plural exhaust holes, and a communication space formed between an inner wall of the housing and an outer wall of the air motor for providing communication between the exhaust holes and the exterior of the cylindrical housing. A cylindrical regulator is rotatably mounted about a central axis of the cylindrical housing. Retaining means is provided on the inner wall of the housing, the cylindrical regulator being provided with a cooperating retaining means which engages the retaining means of the housing so as to limit rotation of the regulator, relative to the housing, to a predetermined rotational range, the cylindrical regulator being further provided with opening/closing means for opening and closing the exhaust holes formed in the air motor in accordance with the rotational position of the regulator relative to the housing.

In another aspect of the present invention there is provided a pneumatic rotating tool having a cylindrical housing, an air motor fixed within the cylindrical housing and formed with plural exhaust holes, and a communication space formed between an inner wall of the housing and an outer wall of the air motor for providing communication between the exhaust holes and the exterior. A cylindrical regulator is rotatably mounted on the cylindrical housing and has retaining means provided on its inner wall which engages the retaining means of the housing so as to limit rotation of the cylindrical regulator relative to the housing to within a predetermined range, the cylindrical regulator being formed with a stepped inner wall to provide inner surface wall portions radially spaced at different distances from the exhaust holes so that the amount of air discharged from the exhaust holes is dependent on the rotational position of the regulator relative to the housing.

DETAILED DESCRIPTION OF THE PREFERRED EMBODIMENTS

First Embodiment

The present invention will be described hereinunder with reference to the accompanying drawings.

Figure 1:
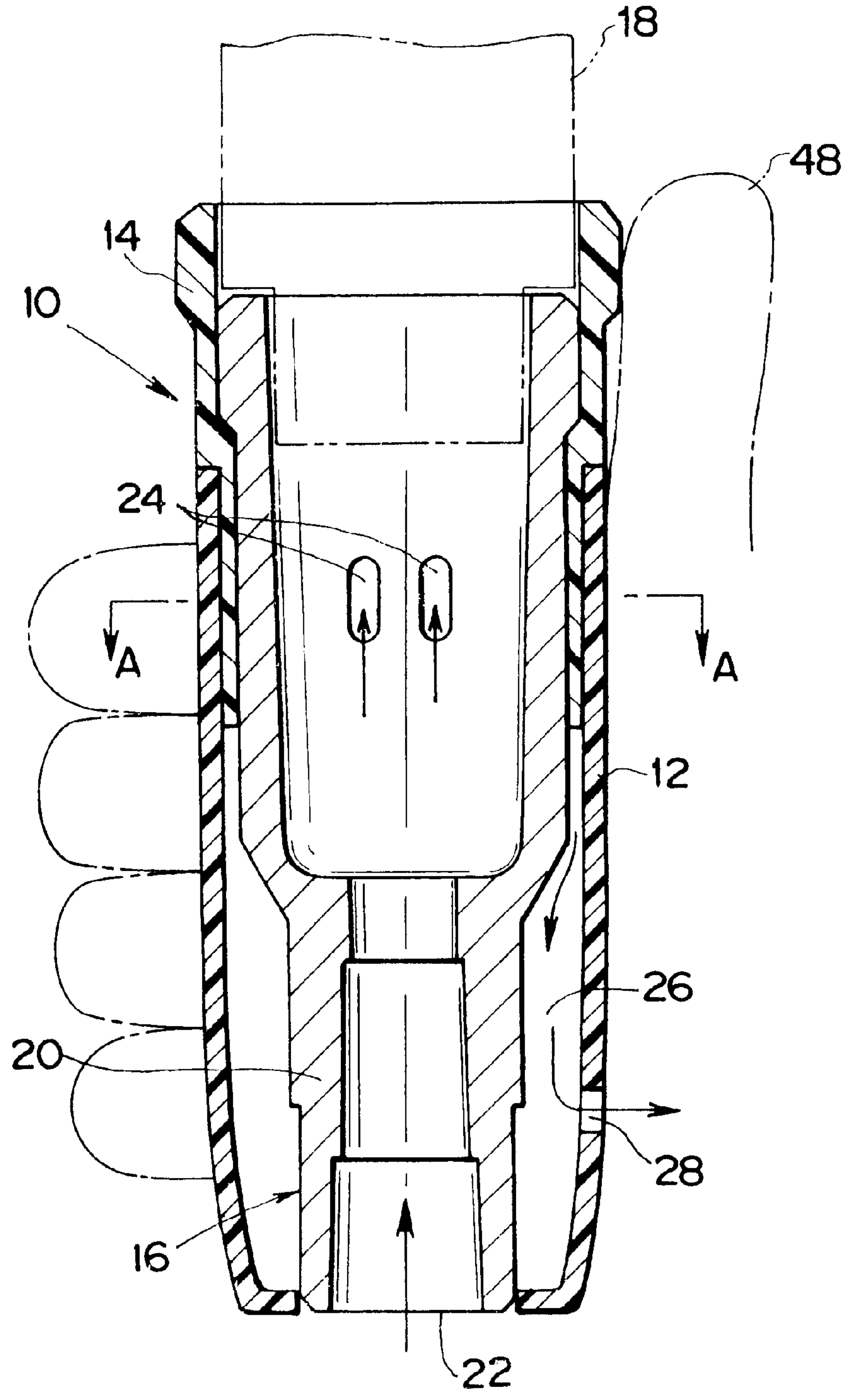
FIG. 1 is a sectional view of a pneumatic rotating tool according to a first embodiment of the present invention.

As shown in FIG. 1, the pneumatic rotating tool of this embodiment, indicated at 10, has a cylindrical housing 12 to be held with one hand, a cylindrical regulator 14 rotatably fitted in the housing 12, an air motor 16 received within and fixed to the housing 12, and a tool 18 to be driven by the air motor 16. As to the air motor 16, only a cylindrical motor body 20, with its internal structure omitted, is shown in FIG. 1. The cylindrical motor body 20 has an air intake opening 22 formed at one end thereof and a total of four exhaust holes 24 formed therein at axially intermediate positions which provide communication between the interior of the motor body and the exterior, the exhaust holes 24 being arranged circumferentially in such a manner that two are located on one circumferential side and the other two are located on a 180° opposite side. A communication space 26 communicating with the exhaust holes 24 is formed between an inner wall of the housing 12 and an outer wall of the motor body 20, and an exhaust hole 28 for communication between the communication space 26 and the exterior is formed in the housing 12. Although in FIG. 1 the exhaust hole 28 is positioned in a side face of the housing 12, it may be formed on a front or rear side of the housing.

Figure 2:
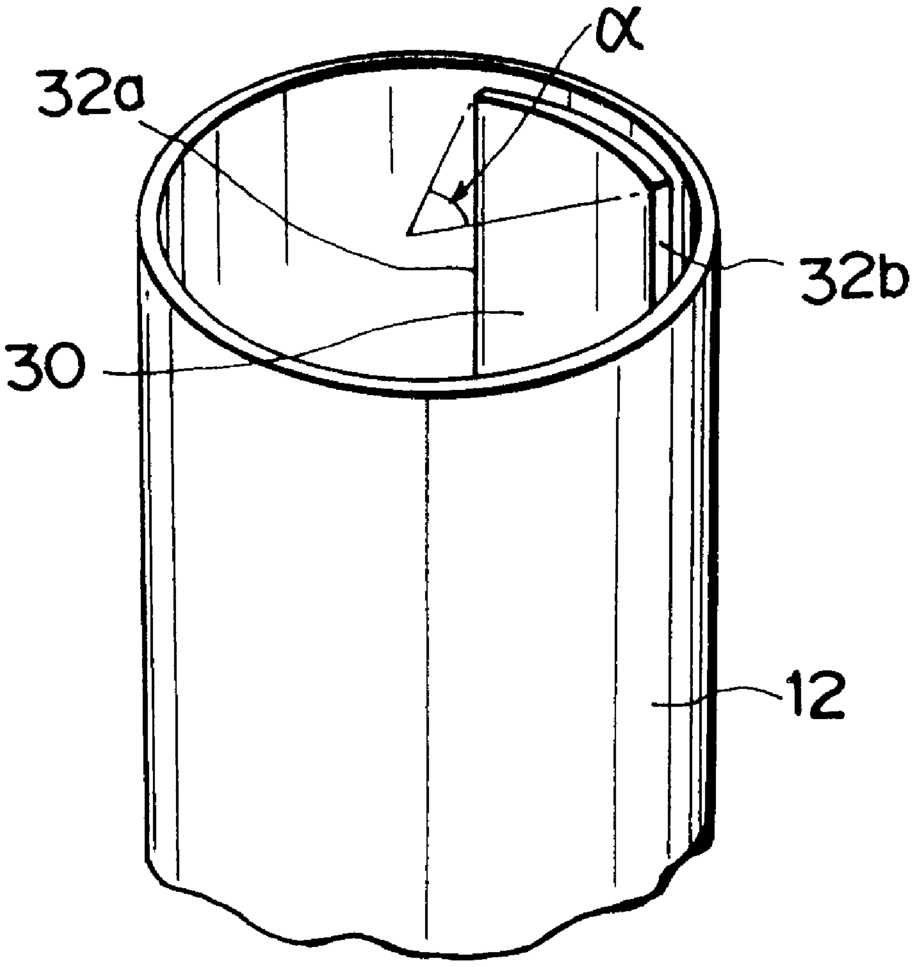
FIG. 2 is a perspective view of the housing of the pneumatic rotating tool of FIG. 1.

As shown in FIG. 2, on the inner wall of the housing 12 is formed a convex portion 30 as a retaining means extending axially from near one opening of the housing. Side faces (edges) of the convex portion 30 are designated as a first side face 32*a* and a second side face 32*b*. Arcuate angle centered on the axis of the convex portion 30 is about 45°, which angle, however, may be varied.

Figure 3:
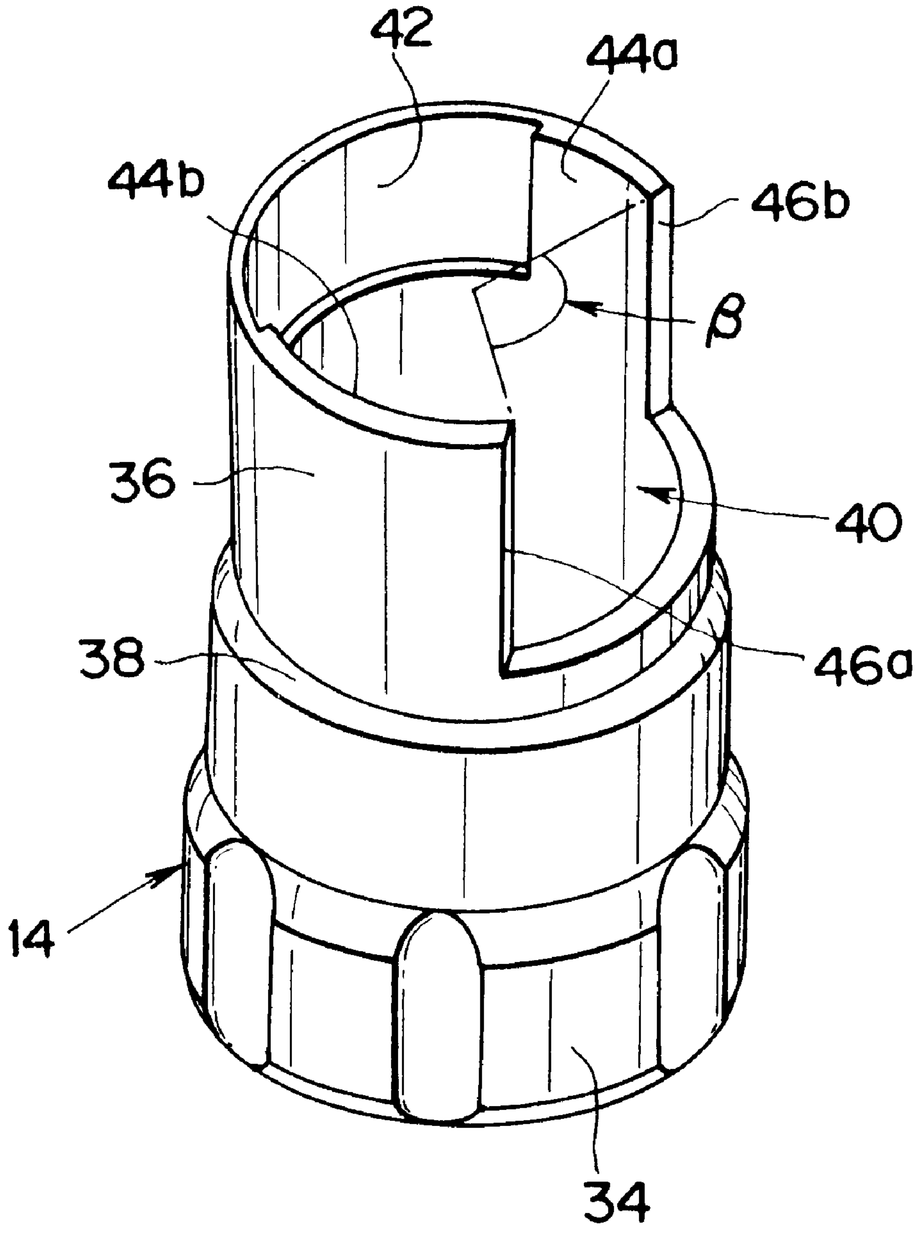
FIG. 3 is a perspective view of the regulator of the pneumatic rotating tool of FIG. 1.

As shown in FIG. 3, an outer wall of the cylindrical regulator 14 is formed with an operating portion 34 of a large diameter at one end and a fitting portion 36 at the opposite end. A step 38 is formed between the operating portion 34 and the fitting portion 36. In the fitting portion 36 of the regulator 14 is formed a cutout 40 serving as retaining means for contact with the convex portion 30 of the housing 12 and also serving as means for opening/closing the exhaust holes 24 of the air motor 16. In an inner wall of the fitting portion 36 of the regulator 14, on the side opposite to the cutout portion 40, there is formed a depression 42 as means for opening the exhaust holes 24 of the air motor 16. The fitting portion 36 is further formed with thick-wall portions 44*a* and 44*b* as means for closing the exhaust holes 24 of the air motor 16, the thick-wall portions 44*a* and 44*b* extending between the cutout portion 40 and depressed portion 42. Inner surfaces of the thick-wall portions 44*a* and 44*b* extending radially inward by an amount corresponding to the depth of the depressed portion 42. End faces (edges) on opposing sides of the cutout 40 are designated a first side face 46*a* and a second side face 46*b*. An arcuate angle of the cutout portion 40 is sufficiently wider than the arcuate angle of the convex portion 30 of the housing 12. In FIG. 3, the arcuate angle of the cutout portion 40 is about 90°, but this angle may be varied.

The outer wall surface of the fitting portion 36 of the regulator 14 is formed so as to provide an exact fit with the inner wall of the cylindrical housing 12 at the position of the convex portion 30. The inner wall surface of the fitting portion 36 of the regulator 14 is formed so as to provide an exact fit with the outer wall of the motor body 20 at the positions of the exhaust holes 24.

The fitting portion 36 of the regulator 14 is inserted into the interior of the cylindrical housing 12 from the end where the convex portion 30 is formed, with the cutout portion 40 receiving the convex portion 30 of the housing 12. When the shoulder 38 of the regulator 14 comes into contact with an end of the housing 12, upon insertion of the fitting portion 36 of the regulator into the housing, further insertion of the regulator 14 is prevented. When the cutout portion 40 formed in the fitting portion 36 of the regulator 14 is fitted on the convex portion 30 of the housing 12, the regulator 14 becomes rotatable through an angle of ($\beta$-$\alpha$) relative to the housing.

Figure 4:
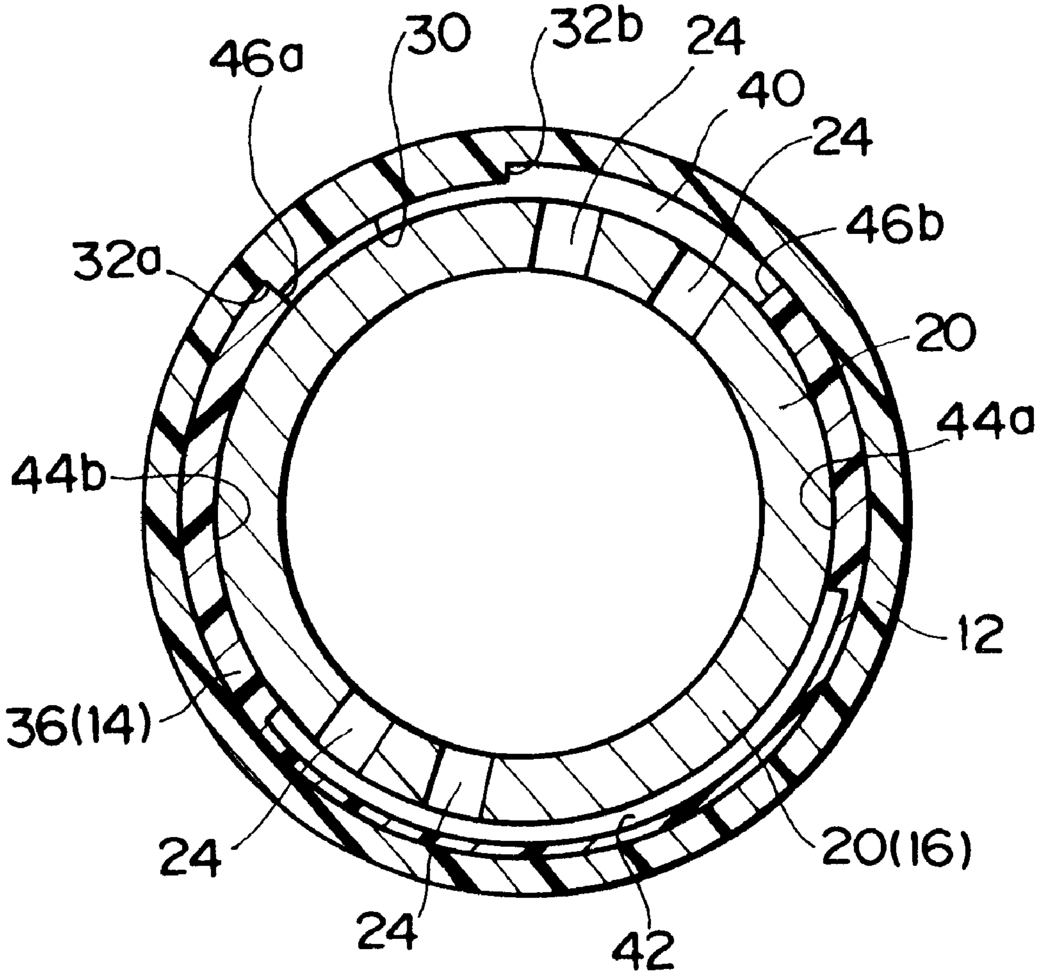
FIG. 4 is a sectional view taken on line A—A in FIG. 1.
Figure 5:
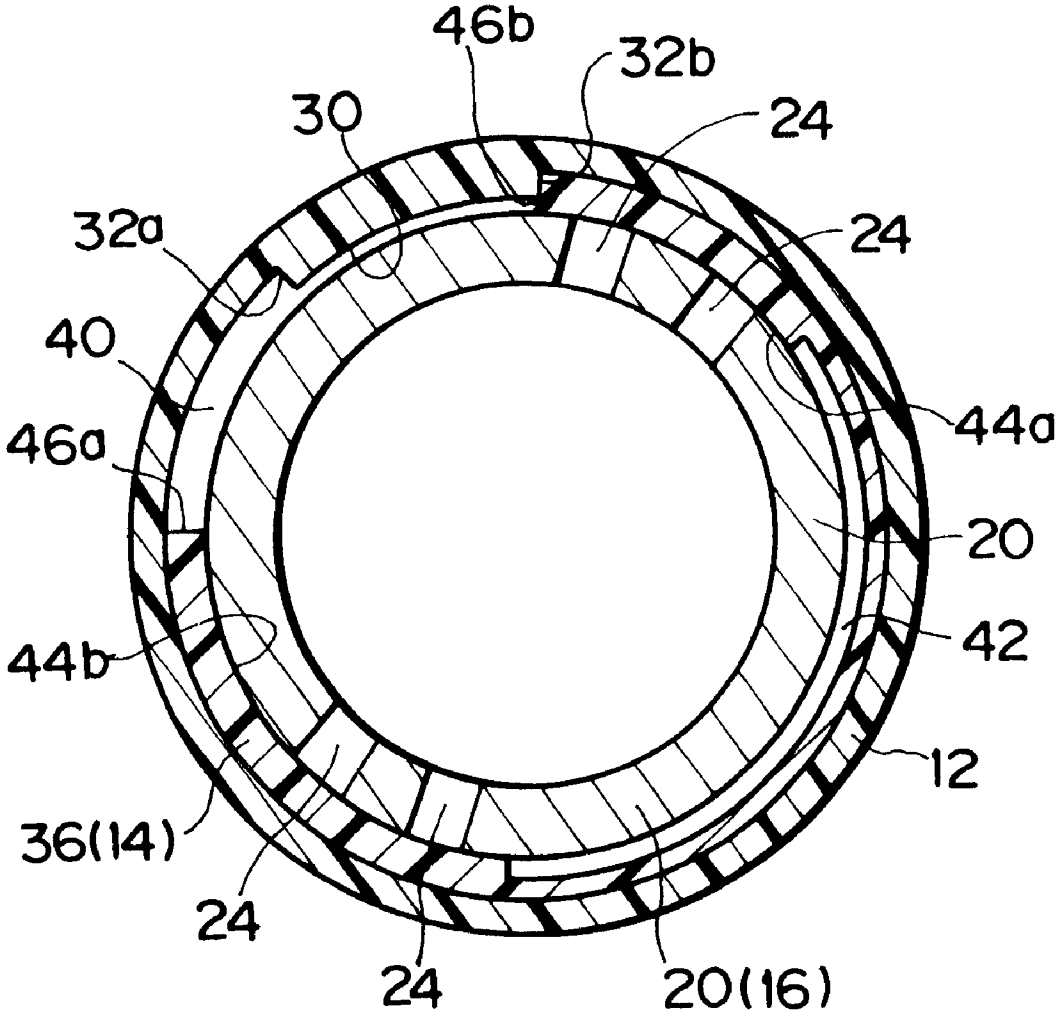
FIG. 5 is a sectional view showing the regulator rotated counterclockwise relative to the housing from the position shown in FIG. 4.

FIGS. 4 and 5 respectively show the regulator 14 rotated with respect to the housing 12 to the limits where the edges of the cutout 40 engage the convex portion 30 of the housing 12. FIG. 4 shows a state in which the first edge 46*a* of the fitting portion 36 is contacted and engaged with the first edge 32*a* of the convex portion 30. In this state, the second edge 46*b* of the fitting portion 36 is not in contact with the second edge 32*b* of the convex portion 30. In the state of FIG. 4, one pair of the exhaust holes 24 is opposed to the cutout portion 40, while the other pair is opposed to the depressed portion 42 formed in the fitting portion 36. With the exhaust holes 24 thus opposing the cutout portion 40 and depressed portion 42, the exhaust holes 24 are open. As a result, air discharged from the exhaust holes 24 passes through the cutout portion 40 and depressed portion 42 and is introduced into the communication space 26.

FIG. 5 shows a state in which the second edge 46*b* of the fitting portion 36 is contacted and engaged with the second edge 32*b* of the convex portion 30. In this state, the first edge 46*a* of the fitting portion 36 is not in contact with the first edge 32*a* of the convex portion 30. In the state of FIG. 5, the two pairs of exhaust holes 24 are respectively opposed to and closed by the thick-wall portions 44*a* and 44*b* of the fitting portion 36 of the regulator 14. Even with the exhaust holes 24 closed by the thick-wall portions 44*a* and 44*b* of the fitting portion 36, there is a fitting error (gap) between the outside surface of the motor body 20 and an inside surface defined by the thick-wall portions 44*a*, 44*b*, so that a small amount of air flows from the exhaust holes 24 into the communication space 26 through that gap.

The housing 12 is held with one hand during operation of the pneumatic rotating tool 10. When the rotational speed of the air motor 16 is to be adjusted, the regulator 14 is rotated with, say, a thumb 48 (a dot-dash line in FIG. 1) of the hand which holds the housing 12. When the regulator 14 is thus rotated to the position shown in FIG. 4, the air flowing out of the exhaust holes 24 is discharged into the cutout portion 40 and depressed portion 42, into the communication space 26, and then is discharged to the exterior through the exhaust hole 28. In this position the amount of air thus discharged is at maximum and the rotational speed of the air motor 16 is also at maximum.

When the regulator 14 is rotated to the position shown in FIG. 5, the amount of air discharged from the exhaust holes 24 becomes minimum and the rotational speed of the air motor 16 is also at its minimum.

When the position of the regulator 14 is an intermediate position between FIGS. 4 and 5, the amount of air discharged becomes intermediate between the maximum and the minimum and so does the rotational speed of the air motor 16.

Second Embodiment

Figure 6:
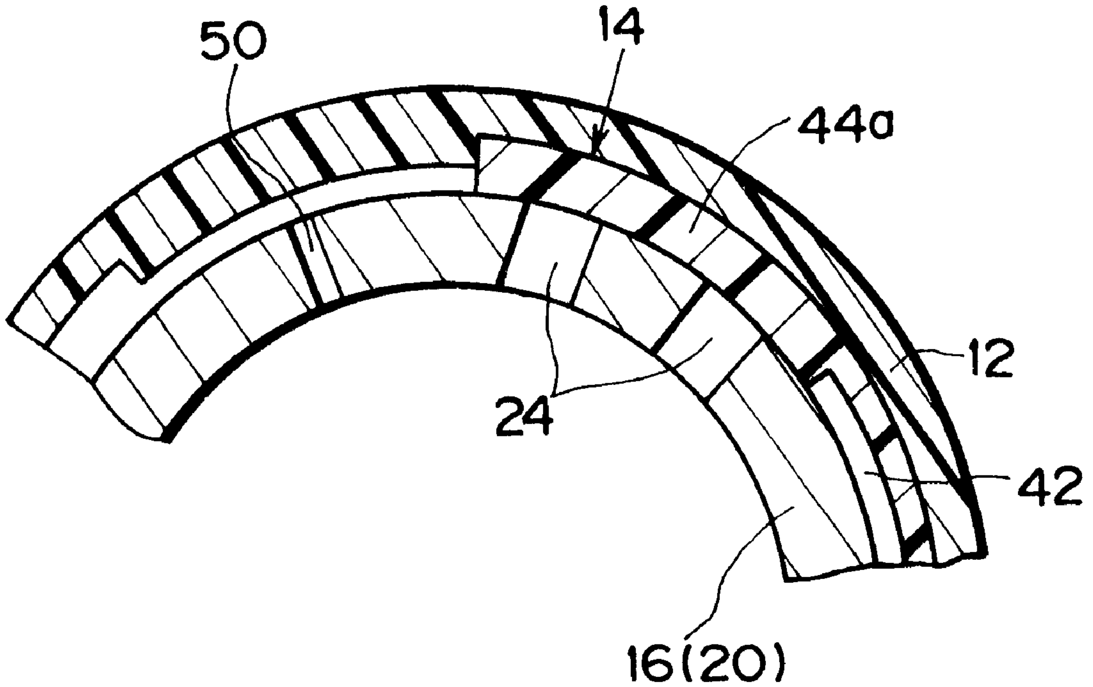
FIG. 6 is a sectional view of a pneumatic rotating tool according to a second embodiment of the present invention.

FIG. 6 illustrates an embodiment which is applied when a required clamping force is to be obtained at a low rotational speed. FIG. 6 shows the same rotational position as in FIG. 5. An exhaust hole 50 for low speed with a diameter smaller than that of the exhaust holes 24 is formed in the motor body 20 of the air motor 16 separate from the exhaust holes 24. The small-diameter exhaust hole 50 for low speed is formed in a position which is never closed, irrespective of the rotational position of the regulator 14. Consequently, even if the exhaust holes 24 are closed by the thick-wall portions 44*a* and 44*b* of the fitting portion 36, air is discharged from the exhaust hole 50 into the communication space 26 and hence it is possible to obtain a required clamping force at a low speed. This prevents the clamping force from becoming weak at a low speed which may occur when the same force is set so as not to become too strong at a high speed.

Third Embodiment

Figure 7:
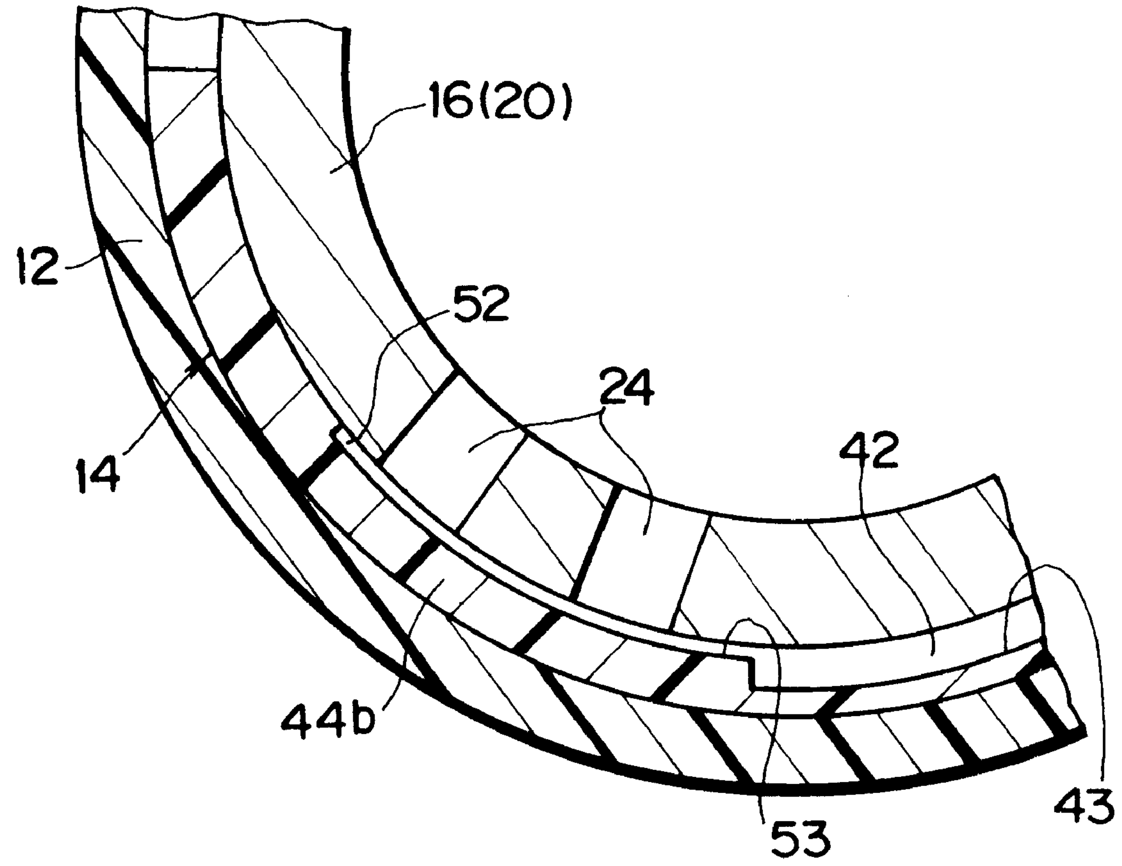
FIG. 7 is a sectional view of a pneumatic rotating tool according to a third embodiment of the present invention.

FIG. 7 illustrates another embodiment for when a required clamping force is required at low speed. FIG. 7 shows the same rotational position as in FIG. 5. In FIG. 5, the thick-wall portions 44*a* and 44*b* of the fitting portion 36 of the regulator 14 close the exhaust holes 24 formed in the motor body 20, while in the embodiment illustrated in FIG. 7 the exhaust holes 24 are not closed. More specifically, in the embodiment illustrated in FIG. 7, a depression (depressed portion) 52 for low speed is formed in the thick-wall portion 44*b* at a position opposed to exhaust holes 24. The depression 52 is shallow in depth and does not close the exhaust holes 24. The depth of the depression 52 for low speed is set smaller than the depth of the depressed portion 42. That is, the distance between an inner wall 53 (equal in radius) which defines the depressed portion 52 for low speed and openings of the exhaust holes 24 is shorter than the distance between the inner wall 43 (equal in radius) which defines the depression 42 and openings of the exhaust holes 24. When the regulator 14 is rotated to the same position as in FIG. 4, the exhaust holes 24 formed in the motor body 20 become opposed to the depression 42 (inner wall 43) of the regulator, while when the regulator 14 is rotated to the position shown in FIG. 7, the exhaust holes 24 become opposed to the depression 52 (inner wall 53) of the regulator. Thus, the regulator 14 is formed with inner walls 43 and 53 of different radial distances from the exhaust holes 24.

When the exhaust holes 24 of the motor body 20 are opposed to the depression 52 for low speed (FIG. 7), air reaches the depression 52 through the exhaust holes 24, then flows from the depression 52 to the depressed portion 42 and is discharged into the communication space 26, or is discharged from the depression 52 directly into the communication space 26. In this embodiment illustrated in FIG. 7, the amount of air discharged is larger than in the first embodiment wherein the thick-wall portions 44*a* and 44*b* close the exhaust holes 24 of the motor body 20, so that it is possible to obtain a required clamping force at a low rotational speed. Although in FIG. 7 the depression 52 for low speed (inner wall 53) having a shallow depth is formed in one thick-wall portion 44*b*, a like depression 52 (inner wall 53) may also be formed in the thick-wall portion 44*a* (not shown).

Although in all of the above first to third embodiments the convex portion 30 is formed as retaining means for the inner wall of the housing 12 and the cutout portion 40 is formed as a mating retaining means for the regulator 14, the retaining means on the inner wall side of the housing 12 may be formed as a concave portion and the retaining means on the regulator 14 side may be formed as a convex portion which is formed on the outer wall of the regulator. However, the diameter of the housing 12 can be made smaller by forming the convex portion 30 as the retaining means on the inner wall of the housing 12 and forming the cutout portion 40 as the retaining means in the regulator 14.

Although the fitting portion 36 of the regulator 14 used in the above embodiments has a depression 42, the depression 42 may be replaced by a cutout.

In the above embodiments the exhaust holes 24 are in two pairs in two positions respectively of the motor body 20. However, the exhaust holes 24 may be formed in one or three or more positions of the motor body 20 and the number of exhaust holes 24 formed in one position may be three or more.

Further, although in the above third embodiment the regulator 14 is formed with two inner walls 43 and 53 in opposition to the exhaust holes 24, the regulator may be formed with an inner wall opposed to the exhaust holes 24 in such a manner that the distance from the exhaust holes increases or decreases gradually with rotation of the regulator. However, it is preferable that the regulator 14 be formed with both inner walls 43 and 53, because otherwise a change in rotational speed would be clearly recognized.

According to the pneumatic rotating tool of the present invention, as set forth hereinabove, when adjusting the rotational speed of the air motor, the regulator can be rotated with a finger of the hand which grasps the housing of the tool. Consequently, the operability of the tool is remarkably improved in comparison with the conventional like tool with which adjustment of the rotational speed of the air motor must be with a hand different from the hand used to grasp the housing of the tool.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A pneumatic rotating tool comprising:

a cylindrical housing;

an air motor fixed within said cylindrical housing and having a plurality of exhaust holes, with a communication space between an inner wall surface of said housing and an outer wall surface of said air motor providing communication between said exhaust holes and an exterior of said housing; and a cylindrical regulator having a distal portion fitted inside of and supported by the inner wall surface of the housing, said cylindrical regulator having first retaining means for engaging second retaining means on the housing for limiting rotation of the regulator relative to the housing to within a predetermined rotational range, and said cylindrical regulator having opening/closing means for opening and closing said exhaust holes formed in said air motor in accordance with rotational position of the regulator relative to the housing.

2. A pneumatic rotating tool according to claim 1, wherein the second retaining means is formed on the inner wall of said housing as a raised convex wall portion and the first retaining means of said regulator is a cutout.

3. A pneumatic rotating tool according to claim 1, wherein said opening/closing means of the regulator includes a depression or cutout in said distal portion providing, when opposing said exhaust holes, an opening for said exhaust holes and a thick-wall portion, when opposing said exhaust holes, closing said exhaust holes, whereby the exhaust holes can be opened or closed by rotating said cylindrical regulator relative to said housing.

4. A pneumatic rotating tool according to claim 1, wherein said cylindrical regulator further has an operating portion larger in diameter than said distal portion.

5. A pneumatic rotating tool according to claim 1, wherein an exhaust hole for low speed having a diameter smaller than that of said exhaust holes of said air motor is formed in the air motor so as to remain open irrespective of rotational position of said regulator.

6. A pneumatic rotating tool comprising:

a cylindrical housing;

an air motor fixed within said cylindrical housing and having a plurality of exhaust holes, with a communication space between an inner wall surface of said housing and an outer wall surface of said air motor providing communication between said exhaust holes and an exterior of said housing; and a cylindrical regulator having a distal portion fitted inside of and supported by the inner wall surface of the housing, said cylindrical regulator having first retaining means for engaging second retaining means on the housing for limiting rotation of the regulator relative to the housing to within a predetermined rotational range, and said cylindrical regulator having a stepped inner wall surface providing inner wall areas at different radial distances from said exhaust holes in order to vary the amount of air discharged from the exhaust holes depending on the rotational position of the regulator.

7. A pneumatic rotating tool according to claim 6, wherein the second retaining means is formed on the inner wall of said housing as a raised convex wall portion and the first retaining means of said regulator is a cutout.

8. A pneumatic rotating tool according to claim 1, wherein said cylindrical regulator further has an operating portion larger in diameter than said distal portion.

9. A pneumatic rotating tool according to claim 6, wherein one of said inner wall areas is in contact with an outer cylindrical surface of said air motor, thereby closing said exhaust holes when opposing same and a second of said inner wall areas is spaced from said exhaust holes when opposing same.

* * * * *

UNITED STATES PATENT AND TRADEMARK OFFICE

CERTIFICATE OF CORRECTION

PATENT NO. : 6,585,060 B1
DATED : July 1, 2003
INVENTOR(S) : Iritani

It is certified that error appears in the above-identified patent and that said Letters Patent is hereby corrected as shown below:

Column 3,
Line 26, after "angle" insert -- β --;
Line 27, after "angle" insert -- α --;
Line 29, after "angle" insert -- β --.

Signed and Sealed this

Twenty-eighth Day of October, 2003

JAMES E. ROGAN
*Director of the United States Patent and Trademark Office*